(12) United States Patent
Weiler et al.

(10) Patent No.: US 11,674,640 B2
(45) Date of Patent: Jun. 13, 2023

(54) SAFETY SYSTEM FOR A MACHINE TOOL

(71) Applicants: Felder KG, Hall (AT); Technische Universität Wien, Vienna (AT)

(72) Inventors: Thomas Weiler, Vienna (AT); Helmut Caudr, Vienna (AT); Friedrich Bleicher, Vienna (AT)

(73) Assignees: Felder KG, Hall in Tirol (AT); Technische Universität Wien, Vienna (AT)

( * ) Notice: Subject to any disclaimer, the term of this patent is extended or adjusted under 35 U.S.C. 154(b) by 551 days.

(21) Appl. No.: 16/686,844

(22) Filed: Nov. 18, 2019

(65) Prior Publication Data
US 2020/0080688 A1 Mar. 12, 2020

Related U.S. Application Data

(63) Continuation of application No. PCT/EP2018/062948, filed on May 17, 2018.

(30) Foreign Application Priority Data

May 19, 2017 (EP) ..................................... 17171966

(51) Int. Cl.
*F16P 3/14* (2006.01)
*B23D 59/00* (2006.01)
(Continued)

(52) U.S. Cl.
CPC ............ *F16P 3/145* (2013.01); *B23D 45/063* (2013.01); *B23D 59/002* (2013.01);
(Continued)

(58) Field of Classification Search
CPC .. B23D 59/001; B23D 59/002; B23D 45/063; B23D 47/08; B23D 5/38; B23D 47/025;
(Continued)

(56) References Cited

U.S. PATENT DOCUMENTS 7,707,920 B2 * 5/2010 Gass ....................... B27B 13/14
83/477.1
8,950,305 B1 * 2/2015 Shiban ................... B27G 19/02
83/58

(Continued)

FOREIGN PATENT DOCUMENTS

EP 2 708 302 3/2014

OTHER PUBLICATIONS

International Search Report dated Jul. 31, 2018 in International (PCT) Application No. PCT/EP2018/062948.

*Primary Examiner* — Ghassem Alie
(74) *Attorney, Agent, or Firm* — Wenderoth, Lind & Ponack, L.L.P.

(57) ABSTRACT

A safety system is provided for a machine tool which has a frame and a tool. The safety system has a clamping device and a motion device. The clamping device is movable by the motion device from a working position, in which the tool is extended and can be used for working, to a safety position, in which the tool is retracted. The motion device has a first magnetic means connected to or arranged on the tool and a second magnetic means connected to or arranged on the frame, such that movement of the tool by the motion device from the working position to the safety position can be triggered and/or at least partially performed by magnetic force.

33 Claims, 10 Drawing Sheets

(51) Int. Cl.
  *B23D 45/06* (2006.01)
  *B23Q 11/00* (2006.01)
  *B27G 19/02* (2006.01)

(52) U.S. Cl.
  CPC ...... *B23Q 11/0089* (2013.01); *B23Q 11/0092* (2013.01); *B27G 19/02* (2013.01); *F16P 3/147* (2013.01)

(58) Field of Classification Search
  CPC .... F10P 3/145; F16P 3/147; F16P 3/12; F16P 3/148; B23Q 11/0089; B23Q 11/0092; B27G 19/02; B27G 19/06; B27G 19/00; B16P 3/14; B27B 5/38; B27B 13/14; B26D 7/24; Y10T 83/773; Y10T 83/089; Y10T 83/081; Y10T 83/7693; Y10T 83/8858; Y10T 83/7726; Y10T 83/7788; Y10T 83/7722
  USPC ......... 83/62.1, 58, 477.2, 471.2, 477.1, 477, 83/639.1, 581, 62, 72, 76.7, 788, 522.12; 144/154.5, 356, 384, 391, 427, 286.5; 361/179
  See application file for complete search history.

(56) References Cited

U.S. PATENT DOCUMENTS

| | | |
|---|---|---|
| 2002/0020265 A1 | 2/2002 | Gass et al. |
| 2004/0159198 A1* | 8/2004 | Peot .................... B23Q 11/0092 30/DIG. 1 |
| 2010/0192789 A1* | 8/2010 | Tse ........................ E05C 19/16 101/126 |
| 2011/0048191 A1* | 3/2011 | Chung .................. B23D 47/00 83/477.2 |
| 2011/0226105 A1* | 9/2011 | Butler .................. B23D 45/067 83/72 |
| 2015/0109523 A1* | 4/2015 | Tanaka ..................... G03B 9/42 348/367 |
| 2018/0304386 A1* | 10/2018 | Gass .................... B23D 59/001 |

* cited by examiner

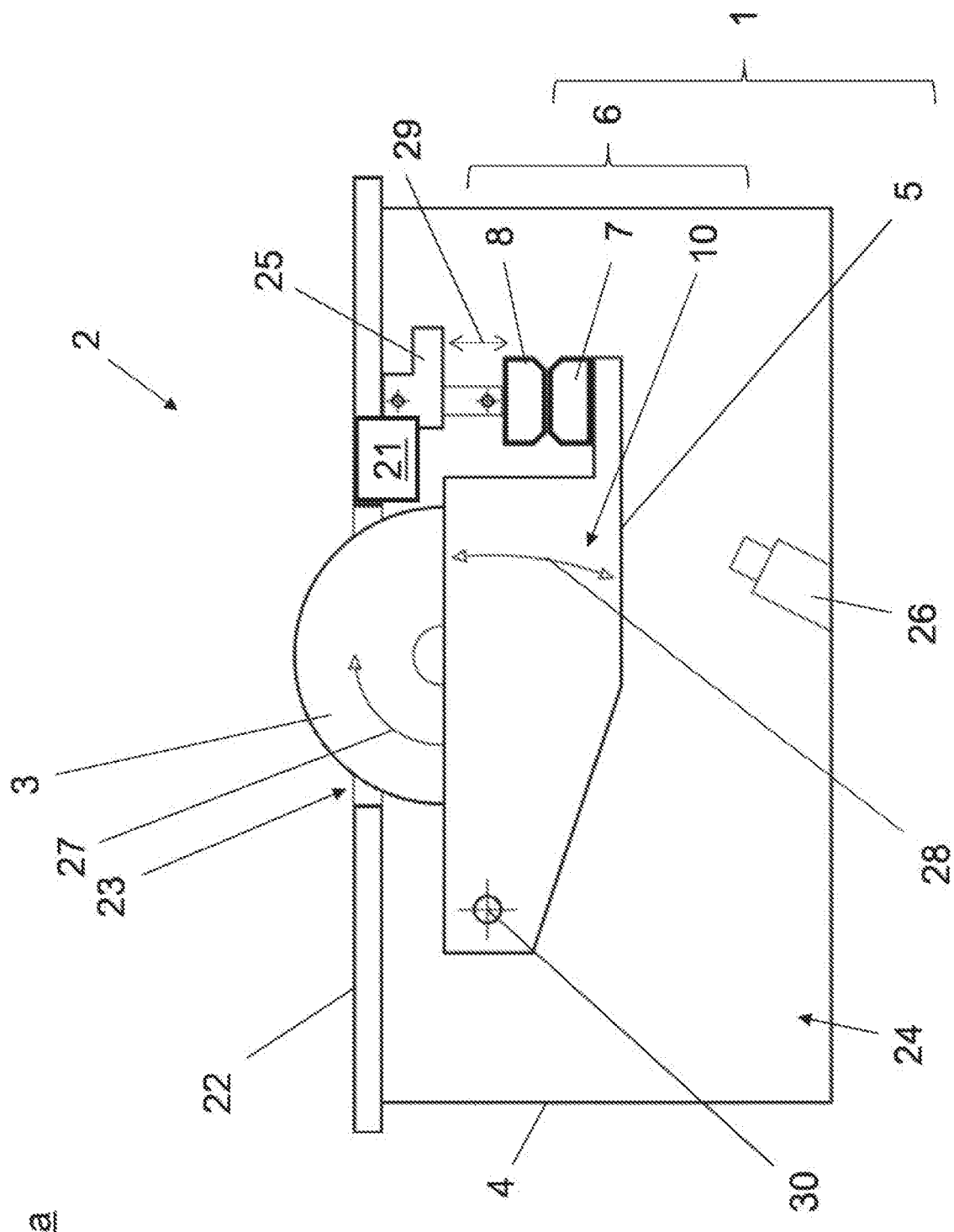

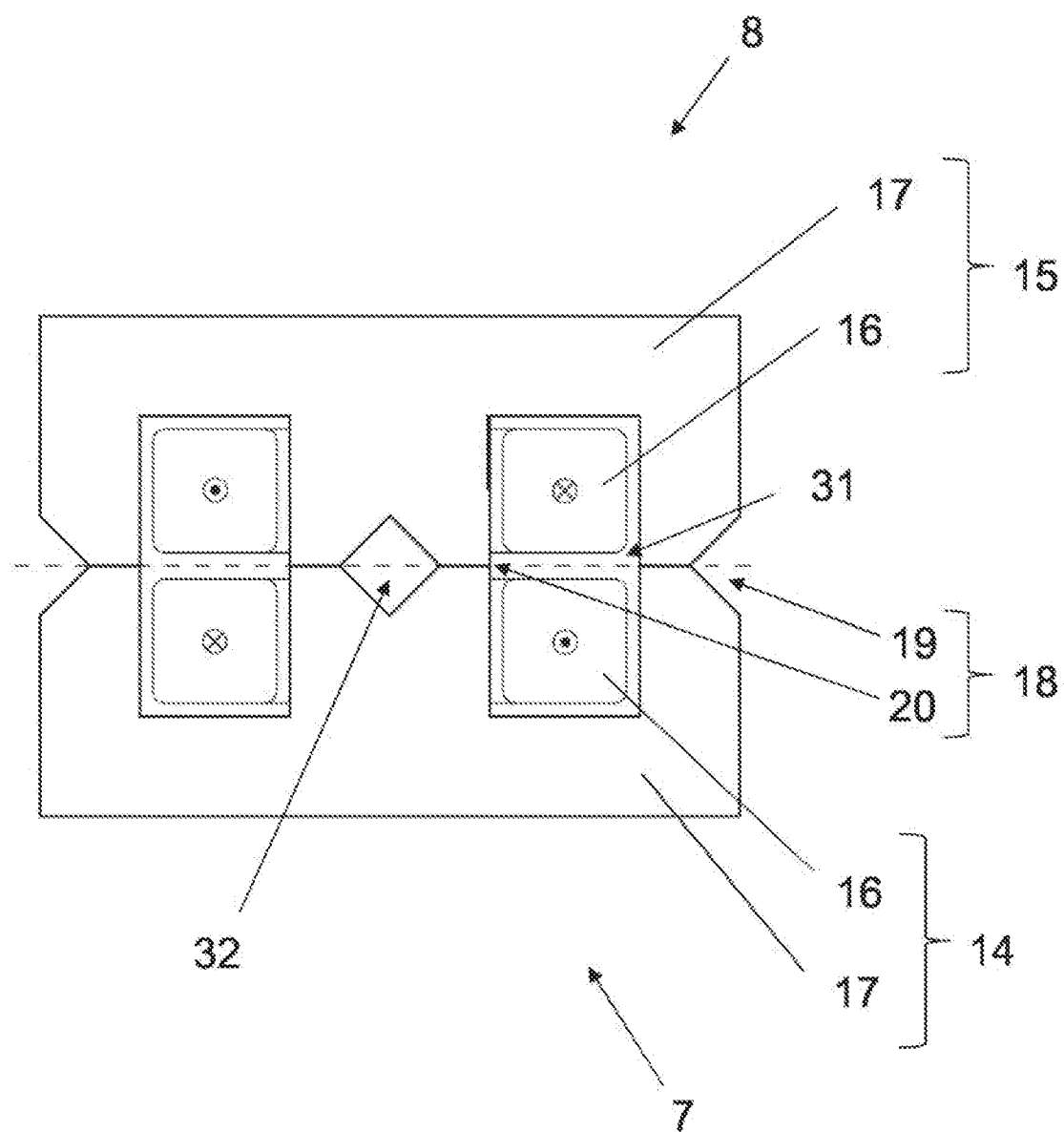

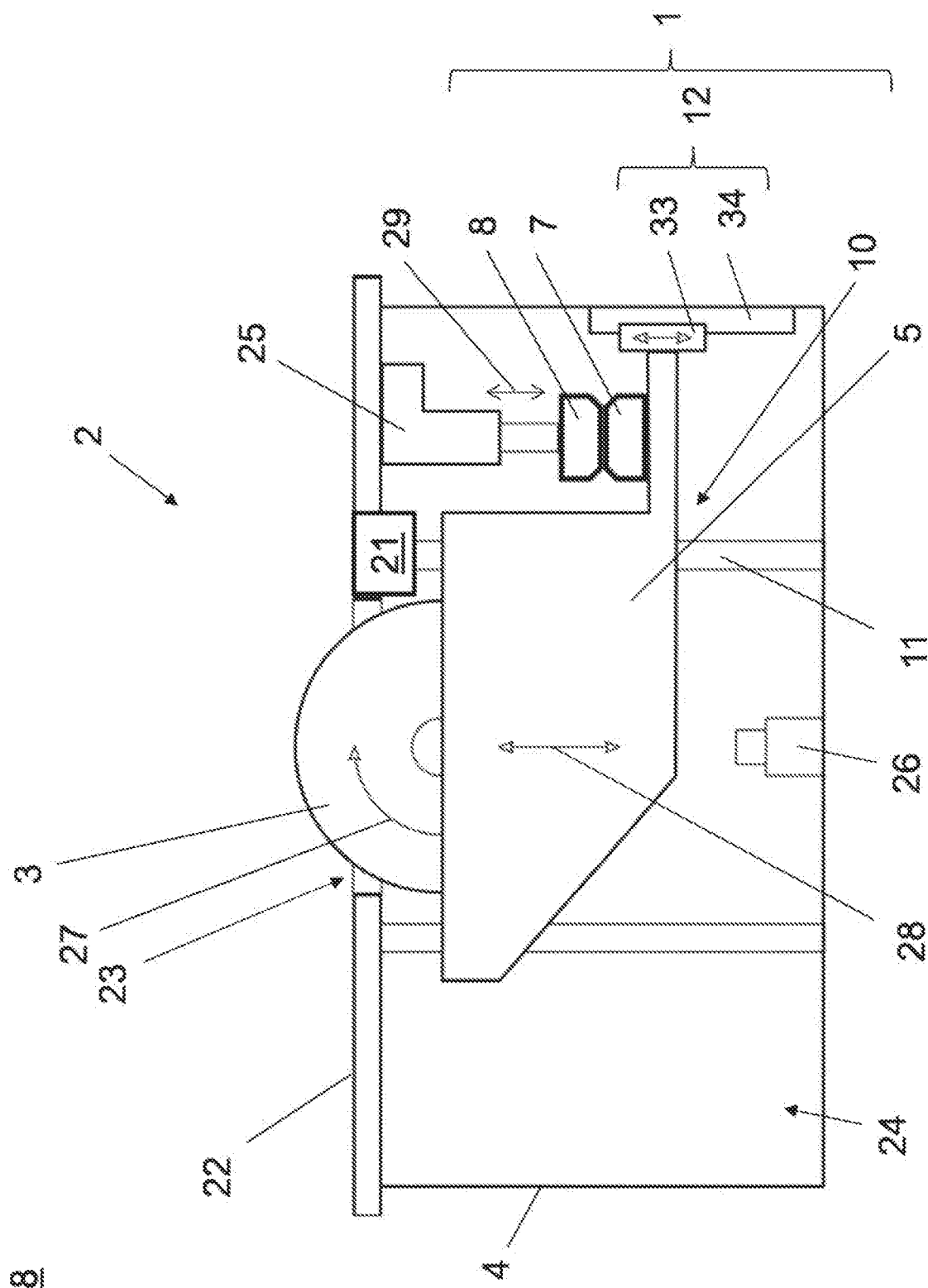

SAFETY SYSTEM FOR A MACHINE TOOL

BACKGROUND OF THE INVENTION

The invention concerns a safety system for a machine tool, a machine tool having such a safety system, and a method of operating such a machine tool.

The use of machine tools with tools is generally known in the handicraft field. In that respect the use of machine tools in the form of sliding table circular saws is widespread especially in the wood-working craft. The manufacturers of such machine tools are constantly occupied with the development of safety systems for machine tools. Nonetheless accidents repeatedly occur, causing very serious injuries. In the case of machine tools, for example circular saw machines, the danger is primarily involved with the tool, in the example of the circular saw machines a rotating tool in the form of a circular saw blade. The contact that is necessary in operation of a machine tool on the part of a user with the workpieces, which are often guided by hand, means that the tool cannot in practice ever be completely isolated from the user by a mechanical protective arrangement. Lack of attention, dismantling or incorrect use of protective arrangements or safety systems also increase the risk of injury.

SUMMARY OF THE INVENTION

The object of the invention is to provide an improved safety system for a machine tool, an improved machine tool, and an improved method of operating a machine tool.

As in the case of a safety system of the general kind set forth, a safety system according to the invention which is designed for a machine tool having a tool can firstly have a clamping device for the tool, arranged moveably on a frame of the machine tool. The clamping device and therewith also the tool can be moveable by a motion device from a working position, in which the tool can be used for working and entails a risk of injury to the user by the tool, into a safety position, in which there is substantially no risk of injury to the user by the tool.

In contrast to safety systems known in the state of the art the motion device of the safety system according to the invention has at least two equally or oppositely magnetized and/or magnetizable magnetic means of which at least a first magnetic means is connected to the tool or is arranged thereon and at least a second magnetic means is connected to the frame or arranged thereon so that the movement of the tool by the motion device out of the working position into the safety position can be triggered and/or at least partially implemented by means of magnetic force.

Generally an arrangement comprising various devices, by the cooperation of which the safety in terms of operation of the machine tool can be increased, can be interpreted as a safety system for a machine tool. The term machine tool can be used generally to denote an apparatus, by means of which a guided movement of a tool, for example a possibly periodic linear movement and/or a rotational movement of the tool, can be performed. The term tool can be used generally to denote a device for manipulation and/or processing of a workpiece, wherein the tool can be for example in the form of a machining tool having at least one tool cutting edge. The term frame of the machine tool can be interpreted generally as denoting a support structure for individual parts of the machine tool. The term clamping device for the tool can be generally interpreted as denoting a device for clamping or mounting a tool in or to the machine tool, wherein the clamping device can be part of a device for carrying out the guided movement of the tool, for example part of a drive or especially a sawing assembly. The term motion device can be used generally to denote a device for moving the tool in addition to that movement serving for manipulation and/or machining of the workpiece. The movement of the tool by the motion device can be effected substantially independently of the movement of the tool for manipulation and/or machining of a workpiece. The term working position can be used generally to denote a position of the tool in which the tool can be brought into engagement substantially directly with the workpiece to manipulated and/or machined. In a working position of the tool there is a risk of injury to a user by virtue of the tool as the user can thus also come into engagement with the tool. Similarly thereto the term safety position of the tool is used generally to denote a position in which generally no direct engagement with the tool is possible for the user and thus there is substantially no risk of injury to the user by the tool.

The term magnetic means can be used generally to denote a magnetic or permanent-magnetic or at least temporarily magnetizable substance. Such an at least temporarily magnetizable substance can be for example in the form of a semi-hard magnetic material. Such semi-hard magnetic materials are known for example by the names VACOZET or CROVAC. Those substances can be in the form of solid bodies or, for example to avoid eddy currents, in the form of a laminated bundle. Production using sintering materials is also conceivable.

The magnetic means can be equally or oppositely magnetized and/or magnetizable and thus magnetically attract or repel each other. A repelling or attracting force can therefore be caused or can act between the magnetic means by virtue of magnetization of the magnetic means.

In principle at least five configurations of the at least two magnetic means are conceivable. Thus the at least two magnetic means can be implemented at least by the following combinations:

permanent magnet and ferromagnetic substance electromagnet (possibly with a core) and ferromagnetic substance permanent magnet and electromagnet (possibly with a core)

electromagnet and electromagnet (possibly with a core in each case)

electromagnet with permanent magnet and electromagnet.

A first magnetic means can be connected to or arranged on the tool so that a force acting on the first magnetic means is transmitted to the tool or the clamping device for the tool. The statement that the first magnetic means is connected to or arranged on the tool means that the at least one first magnetic means is connected to or arranged on the tool either directly or indirectly, for example by way of the clamping device. A second magnetic means can be connected to or arranged on the frame so that a force acting on the second magnetic means can be transmitted to the frame of the machine tool.

By virtue of the arrangement and the corresponding cooperation of the at least two magnetic means the movement of the tool by the motion device from the working position into the safety position can be triggered and/or at least partially implemented by means of magnetic force. Thus the movement from the working position into the safety position can be initiated by means of a force acting between the at least two magnetic means so that the tool firstly begins to move from the working position in the direction of the safety position. The triggered movement can be further continued by an on-going action of the force acting between the at least two magnetic means. Alternatively or also in supporting relationship with a magnetic force which continues to be applied, the movement can be further continued by an additional force, for example from a force storage means in the form for example of a spring or, in the case of a suitable arrangement of the tool in the machine tool, also by the force of gravity. Triggering and/or at least partial implementation of the movement can be effected for example by switching off, compensating or applying an attracting or repelling magnetic force acting between the at least two magnetic means. The magnetic force occurring can be for example—depending on the respective design configuration of the machine tool—in the region of several kilonewtons. A range of 40 to 4000 N or more is preferred.

The statement that the movement of the tool by the motion device from the working position into the safety position can be triggered by means of magnetic force signifies that, at least in the initial position of the movement, at least a magnetic force acts on the tool or the clamping device. In that respect the action of additional forces, for example a force due to weight, is not excluded.

The statement that the movement of the tool by the motion device from the working position into the safety position can be at least partially implemented by means of magnetic force means that at least a magnetic force is acting during at least a part of the movement. The action of additional forces, for example a force due to gravity, is not excluded in that respect.

The magnetic force can act in that case for example over a duration of 1 second to 500 ms or less, preferably 500 ms to 100 ms or less, particularly preferably 100 ms to 50 ms or less.

Triggering and/or at least partial implementation of the movement by a magnetic force has the advantage that it can take place in wear-free and damage-free relationship.

In addition triggering and/or at least partial implementation of the movement by a magnetic force can allow very fast triggering times (very short latency times), that is to say for example the magnetic force can be very rapidly switched on or off.

In that respect it may be advantageous if the motion device has a holding device by which the tool is held in the working position by a holding force. Thus a force can be applied or established by the tool for manipulation and/or machining of a workpiece without the tool thereby being unintentionally moved out of the working position. In that case the holding force can act on the clamping device for the tool. The holding force applied can be for example—depending on the respective design configuration of the machine tool—in the region of several kilonewtons. A range of 50 to 4000 N or more is preferred.

The holding force can be at least partially applied by way of a positively locking relationship and/or at least partially by way of a force-locking relationship and/or at least partially by at least one of the magnetic means. The holding force which is at least partially applied by way of a positively locking relationship can be applied for example by way of a snap-action connection, for example between the clamping device for the tool and the frame of the machine tool. The holding force at least partially applied by way of a force-locking relationship can be applied for example by way of a clamping connection, for example between the clamping device for the tool and the frame of the machine tool. The holding force however can also be applied at least partially be at least one of the magnetic means, for example by an energized electromagnet, a magnetized magnetically semi-hard material or a permanent magnet. Advantageously the holding force can be overcome upon triggering and/or at least partial implementation of the movement, without damage.

In addition it can be advantageous in that respect if the holding force for triggering the movement of the tool by the motion device from the working position into the safety position can be magnetically overcome by means of at least one of the magnetic means. In that case the magnetic means serving to overcome the holding force can be the magnetic means applying the holding force or it can be an additional magnetic means.

It can basically be advantageous if the motion device has a guide for the movement of the tool by the motion device, the tool preferably being in the form of a linear guide. Such a guide can allow guided movement of the tool or the clamping device from the working position into the safety position. In that way it is possible to allow a predeterminable configuration for the movement. The guide can be in the form of a linear guide, that is to say in the form of a guide with which the tool or the clamping device for the tool is moved along a substantially straight connecting line between the working position and the safety position. The tool or the clamping device for the tool can in that case be mounted linearly displaceably on the frame of the machine tool. As an alternative thereto the guide can be in the form of a pivoting device, with which for example the tool or the clamping device for the tool can be mounted on the frame of the machine tool pivotably about a pivot axis.

It can be advantageous for the magnetic means to include at least one permanent magnet. For example the holding force by which the tool or the clamping device is held in the working position can be applied by such a permanent magnet. It is also conceivable to use a magnetically semi-hard material which can perform the function of a permanent magnet by virtue of its remanence magnetization.

It can be advantageous for the magnetic means to include at least one magnetizable substance, preferably a ferromagnetic substance. The ferromagnetic substance can for example constitute a core of a coil of an electromagnet. The magnetic means can also include a soft-magnetic substance.

It can be advantageous if the magnetic means include at least one electromagnet, preferably at least two electromagnets. The magnetic means which is in the form of an electromagnet or the magnetic means which are in the form of an electromagnet can serve to apply a holding force and/or to trigger and/or at least partially implement the movement of the tool from the working position into the safety position.

In that respect it can be advantageous for the at least one electromagnet to be in the form of a coil with a magnetizable core. The core or a part of the core can also be to a certain degree permanently magnetized or magnetizable (remanence field). The core can be of a one-part or multi-part configuration. In a particularly advantageous configuration of the core, the core can involve a laminated structure, possibly also partially. Such a laminated structure can be provided for example in the form of a laminated bundle made up of individual lamellas. The core can be of a rotationally symmetrical shape, for example in the form of a torus or a cylinder. A prism-shaped or cuboidal structure is however also conceivable. The core or also parts of the core can be made from an at least temporarily magnetizable material (soft-magnetic, semi-hard or hard-magnetic material). Production of the core or also parts thereof from a magnetically semi-hard material can give the advantage that—by virtue of the fact that at least temporarily persisting magnetization occurs only after a first-time magnetization—manufacture, processing, handling and assembly of such a core is substantially easier and safer than for example a core which is already magnetized (possibly being a permanent-magnet core).

In that respect it may further be advantageous if the magnetic means include at least two electromagnets, wherein the coils of the at least two electromagnets are connected in series and preferably in the assembled position in the motion device are of an oppositely oriented winding direction. By virtue of a series or serial connection of the coils it is possible to easily permit simultaneously activation or also deactivation of the magnetic means. A winding direction of the two coils of the electromagnets, that is oriented in opposite relationship in the assembled position of the motion device, can permit a repelling force between the two magnetic means when the coils are energized.

It may be advantageous if the core is initially substantially in the form of a cylinder, a prism or a cuboid with a peripheral surface and two end faces. In addition the core can be arranged substantially concentrically with the coil. The configuration of the core can be such that at least one of the end faces of the core, that is to say at least one of the cover surfaces of the cylinder, prism or cuboid has in an edge region means for guiding the magnetic flux. It can also be advantageous if the coil is at least partially embedded in the core.

In regard to the configuration of the core it can be advantageous if the means for guiding the magnetic flux are in the form of at least one substantially annular extension at at least one of the end faces of the core. If the core were of a different form the extension can be suitably adapted. Thus for example in the case of a prism-shaped or cuboidal form for the core the means for guiding the magnetic flux can be of an at least portion-wise approximately bar-shaped or web-like form. The means for guiding the magnetic flux can therefore for example be substantially in the form of a bar-shaped structure projecting axially and/or radially from the basic shape of the core.

In that respect it can be advantageous if the at least one substantially annular or possibly also bar-shaped extension is of a substantially trapezoidal cross-section. The extension can be of a tapering cross-sectional shape.

Such means for guiding the magnetic flux and also such an advantageous cross-sectional shape can locally produce a particularly high flux density and thus can provide an increase in the magnetic force between the magnetic means.

It can basically be advantageous if the at least two magnetic means are arranged in mutually opposite relationship, preferably in mutually coaxially opposite relationship. That can achieve a symmetrical distribution of the forces operative between the two magnetic means.

It can be advantageous if the safety system has a detection device for detecting a risk of injury to a user by the tool. The detection device can be adapted to detect by means of suitable sensors an approach movement and/or contacting of a user—or however also a foreign body in a workpiece, like for example a nail in a piece of wood.

A particularly advantageous configuration of a safety system can be afforded if triggering and/or implementation of the movement of the tool by the motion device is effected in dependence on detection of a risk of injury to a user by the tool. For example after detection by the safety system according to the invention, triggering and/or at least partial implementation of the movement can already occur after about 1 ms or less, preferably about 500 µs or less, particularly preferably 200 µs or less. By virtue of such an advantageously short latency time therefore for example when a user approaches the tool at a speed of for example about 1 m/s, triggering of the movement can occur at a distance relative to the tool of for example about 2 to 5 mm, preferably 1 to 2 mm or less, particularly preferably 0.5 to 1 mm or less can occur, and nonetheless a safe movement of the tool out of the working position into the safety position can take place. False triggering effects as occur for example in the safety systems known in the state of the art, by virtue of the great latency times thereof and accordingly early triggering, can thus be avoided.

Such a short latency time in comparison with the state of the art permits faster initiation of a withdrawal movement of the tool out of the working position into the safety position.

As was already mentioned in the opening part of this specification, protection is also sought for a machine tool, in particular a sliding table circular saw, having a safety system as described hereinbefore.

An advantageous configuration of such a machine tool can be afforded if the machine tool has a table for supporting a workpiece and a tool in a working position projects at least partially out of an inner region of the machine tool above the table and in a safety position the tool is arranged substantially completely beneath the table in an inner region of the machine tool.

In that respect it can be advantageous if the machine tool has a displacement device for the position of the tool relative to the table in a working position of the tool, wherein the displacement device is preferably arranged between the second magnetic means and the frame. In a configuration of the machine tool in the form of a sliding table circular saw it is possible for example to set the cutting depth of the saw blade of the circular saw by the displacement device.

It can further be advantageous if the machine tool has an end position damper for damping the movement of the tool when reaching the safety position.

It can basically be provided for the safety system that the first magnetic means and the tool are motionally coupled together and upon a movement of the tool by the motion device from the working position into the safety position the first magnetic means and the tool are moved jointly. Such a motion coupling can be afforded over the entire distance of the movement of the tool by the motion device from the working position into the safety position. Motion coupling is afforded for example by the first magnetic means being connected to or arranged on the tool in such a way that the first magnetic means is also moved in the movement of the tool by the motion device. By virtue of the motion coupling it is possible to achieve a direct action, which occurs without any time delay, in respect of the magnetic force for triggering and/or at least partially implementing the movement of the tool by the motion device from the working position into the safety position.

For the safety system, it can be provided that the magnetic means include at least one energizable electromagnet. In that respect, it can be provided that, in the working position in a non-energized state of the at least one electromagnet, an attracting magnetic force acts between the magnetic means. By virtue of such an attracting magnetic force—or by at least a part thereof—the tool can be held, for example, in the working position. It can further be provided that, in an energized state of the at least one electromagnet, a repelling magnetic force acts between the magnetic means. By virtue of that repelling magnetic force, a movement of the tool by the motion device from the working position into the safety position can be triggered and/or at least partially implemented. The attracting magnetic force acting in an unpowered state of the at least one electromagnet between the magnetic means can be caused by at least one permanent magnet and/or a magnetically semi-hard material. In that case, one of the magnetic means can include the permanent magnet and/or the magnetically semi-hard material. Thus, one of the magnetic means, for example, the second magnetic means, can include the permanent magnet and/or the magnetically semi-hard material. In addition, one of the magnetic means, for example, the first magnetic means, can include the energizable electromagnet. The permanent magnet and/or the magnetically semi-hard material can be arranged in one of the magnetic means, for example, in the second magnetic means, in such a way that, in the working position of the tool in which the first and second magnetic means are arranged in immediate proximity with each other, a magnetic force is induced in the first and second magnetic means and the first and second magnetic means are attracted by a magnetic force generated thereby. The energizable electromagnet can be arranged in one of the magnetic means, for example, in the first magnetic means, in such a way that the magnetic flux which is built up upon energization of the electromagnet and which is subsequently produced is directed in opposite relationship to the magnetic flux caused by the permanent magnet and/or by the magnetically semi-hard material. In that way, a repelling magnetic force can be produced between the first and second magnetic means. It can be provided that the magnetic means have two energizable electromagnets and the first and the second magnetic means each include an electromagnet. In that case, the electromagnet and the permanent magnet and/or the magnetically semi-hard material can be arranged in a magnetic means, for example, in the second magnetic means, in such a way that the magnetic fluxes thereof (in the energized state of the electromagnet) are additively superimposed. The second energizable electromagnet can be arranged in the other, for example, first magnetic means, in such a way that the magnetic flux, which is built up upon energization of the electromagnet and subsequently persists, is directed in opposite relationship to the above-mentioned magnetic fluxes (that is to say, those of the, for example, second magnetic means). In that way, the magnetic flux which is caused by the permanent magnet and/or magnetically semi-hard material, and which in the unenergized state of the electromagnets can serve for at least partially applying a holding force, can contribute in the energized state of the electromagnets to the repellent force.

As mentioned in the opening part of this specification protection is also claimed for a method of operating a machine tool.

Such a method of operating a machine tool in particular as described hereinbefore having a moveable tool, a detection device for detecting a risk of injury to a user by the tool and a safety system in particular as described hereinbefore includes at least the following steps:
  operating the machine tool with the tool in a working position,
  detecting a risk of injury to a user by the tool by means of the detection device, and
  moving the tool into a safety position by means of the motion device of the safety system, wherein the movement is triggered and/or at least partially implemented by means of magnetic force.

In that respect it can be advantageous if the machine tool further has a displacement device for the position of the tool relative to a table of the machine tool in a working position of the tool, wherein in a further step in the method the tool is moved back from the safety position into the working position by means of the displacement device. Thus after a movement of the tool from the working position into the safety position a return of the tool into the working position can occur.

BRIEF DESCRIPTION OF THE DRAWINGS

Further details and advantages of the present invention are described more fully hereinafter by means of the specific description with reference to the embodiments by way of example illustrated in the drawings in which:

FIG. 2a is a diagrammatic view of a second embodiment of a machine tool in a working position, FIG. 7 is a diagrammatic sectional view of a further embodiment of magnetic means, and FIG. 8 is a diagrammatic view of a third embodiment of a machine tool with a tool in a safety position.

DETAILED DESCRIPTION OF THE INVENTION

Figure 1A:
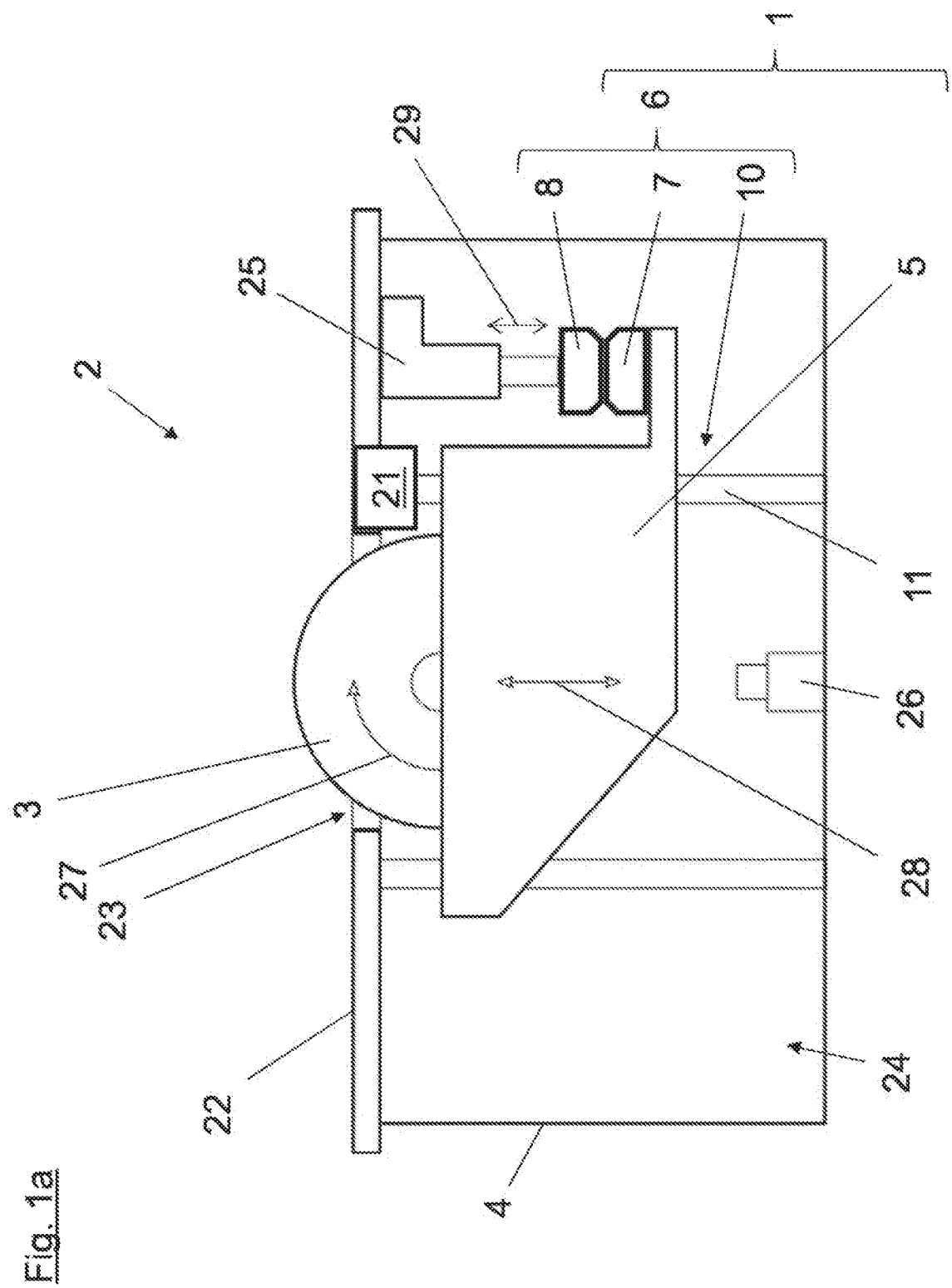
FIG. 1a is a diagrammatic view of a first embodiment of a machine tool with a tool in a working position.
Figure 1B:
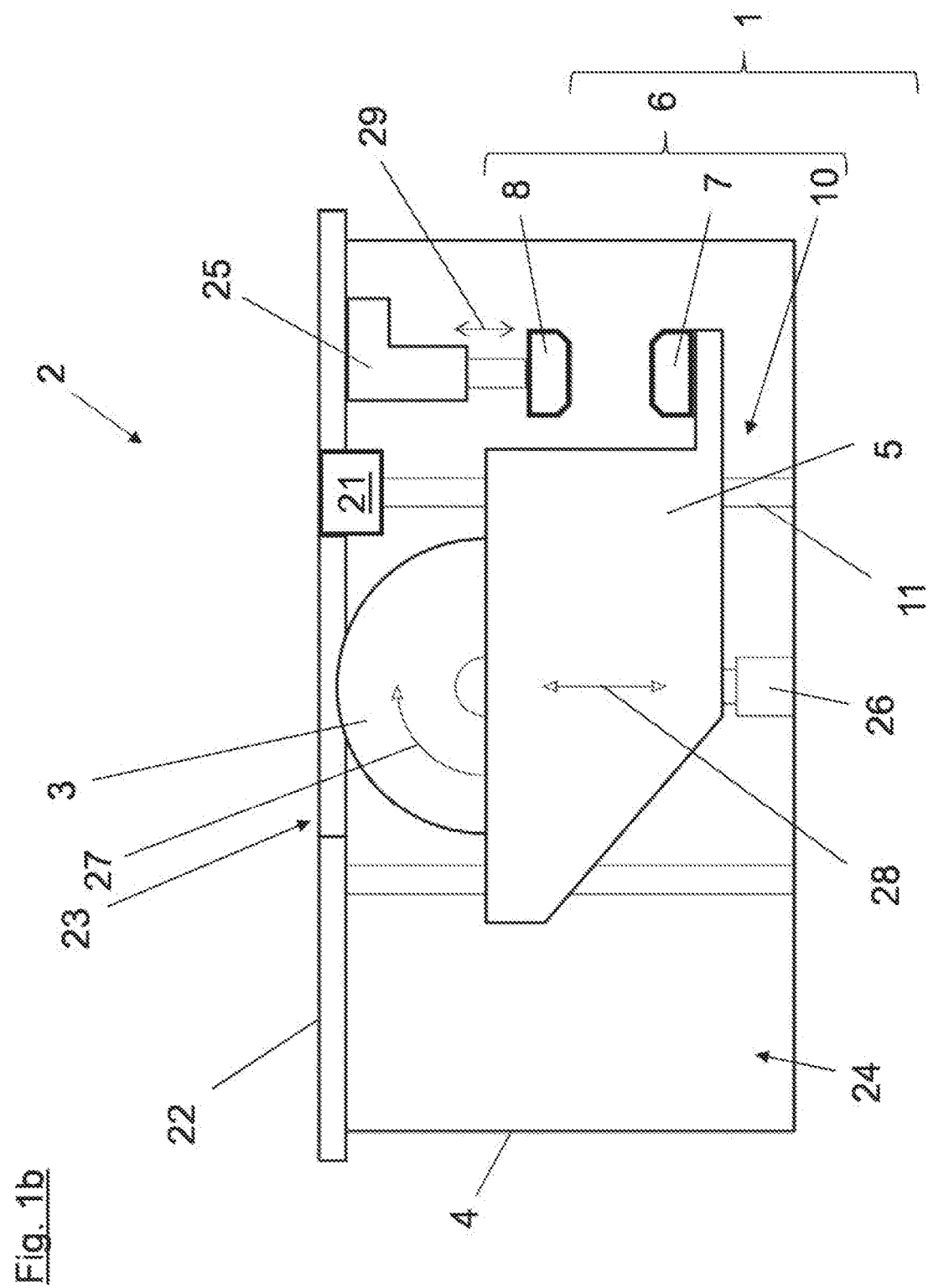
FIG. 1b is a diagrammatic view of a first embodiment of a machine tool with a tool in a safety position.
Figure 3:
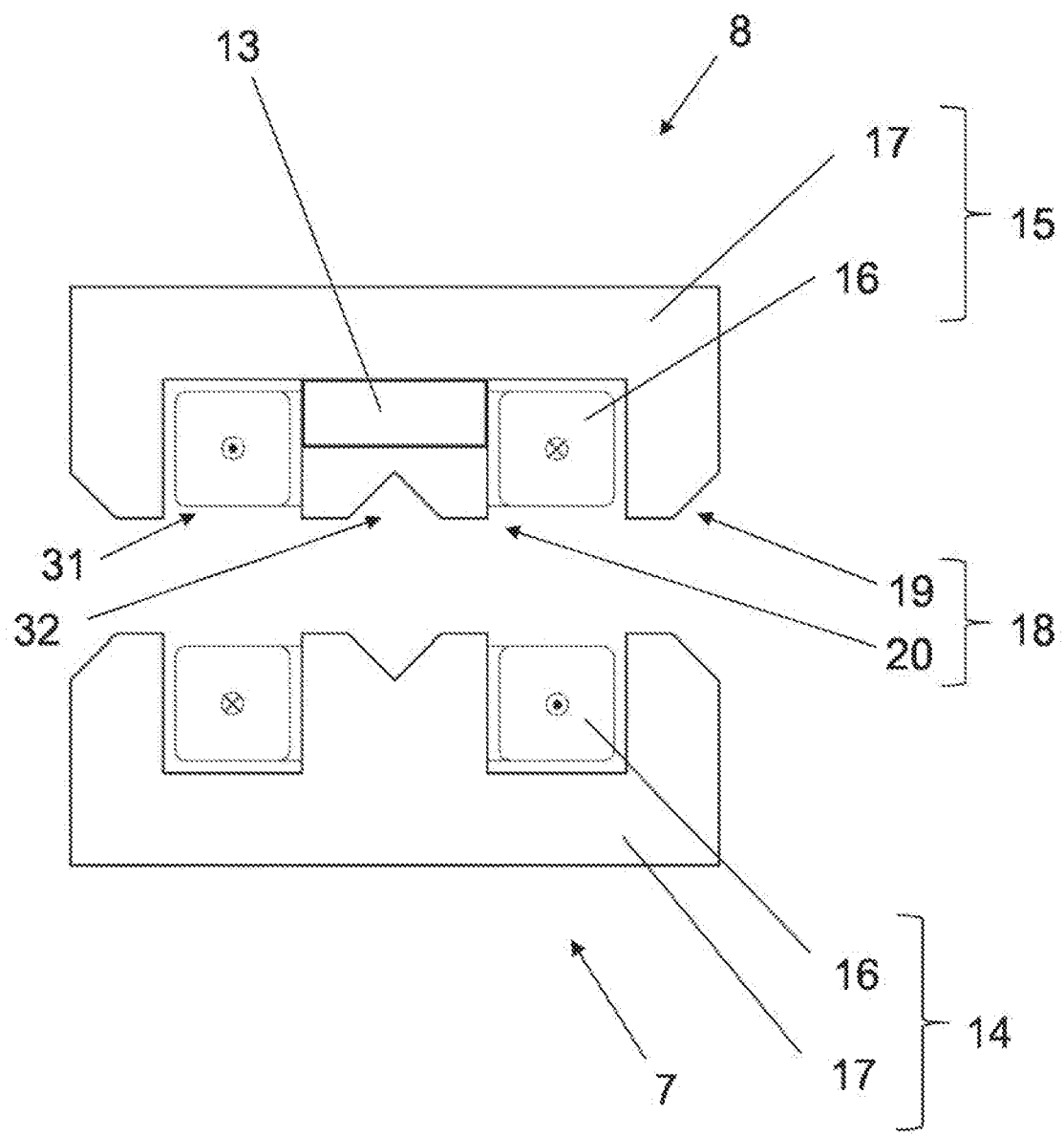
FIG. 3 is a diagrammatic sectional view of magnetic means.
Figure 4:
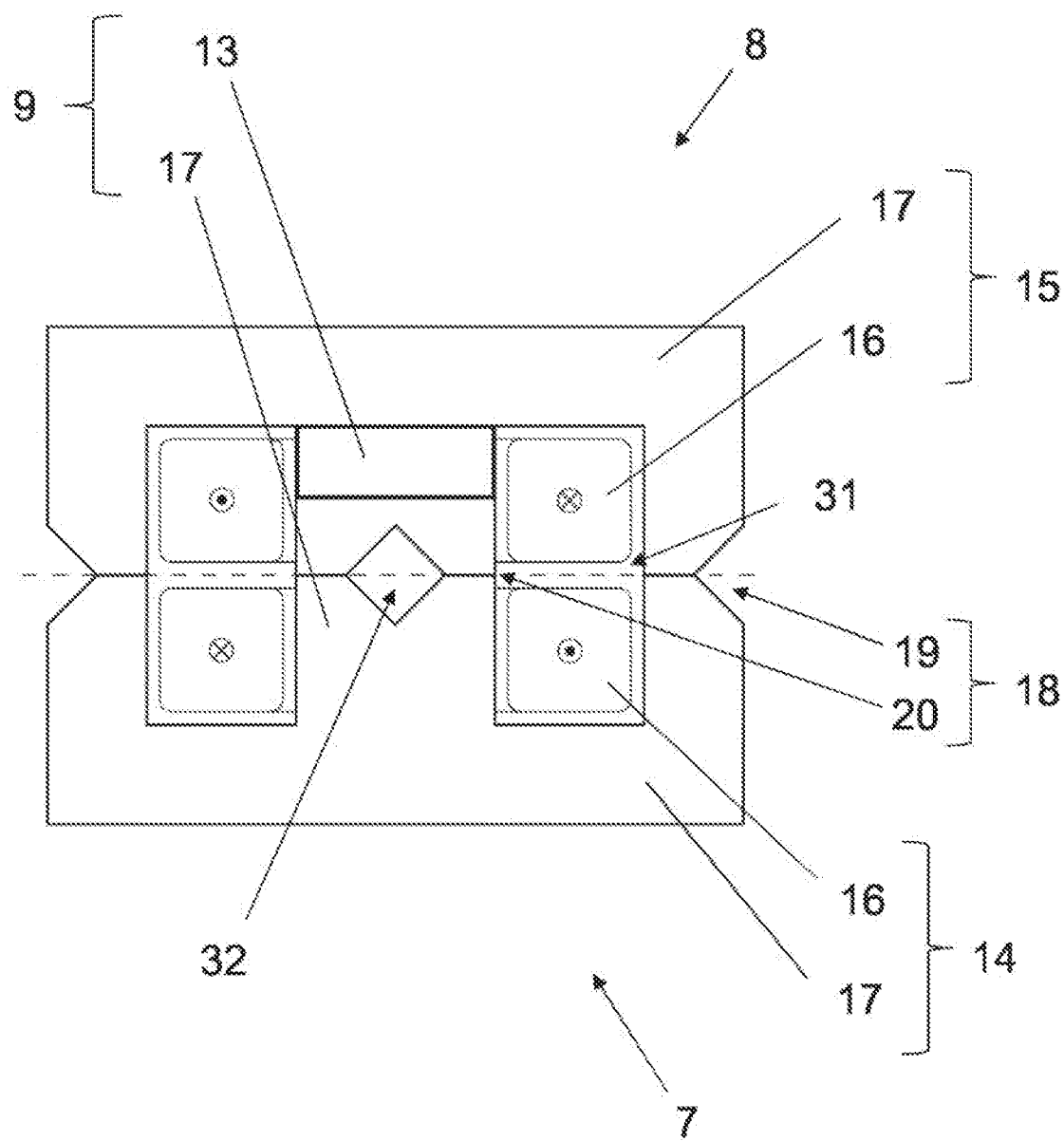
FIG. 4 is a further diagrammatic sectional view of magnetic means.
Figure 5:
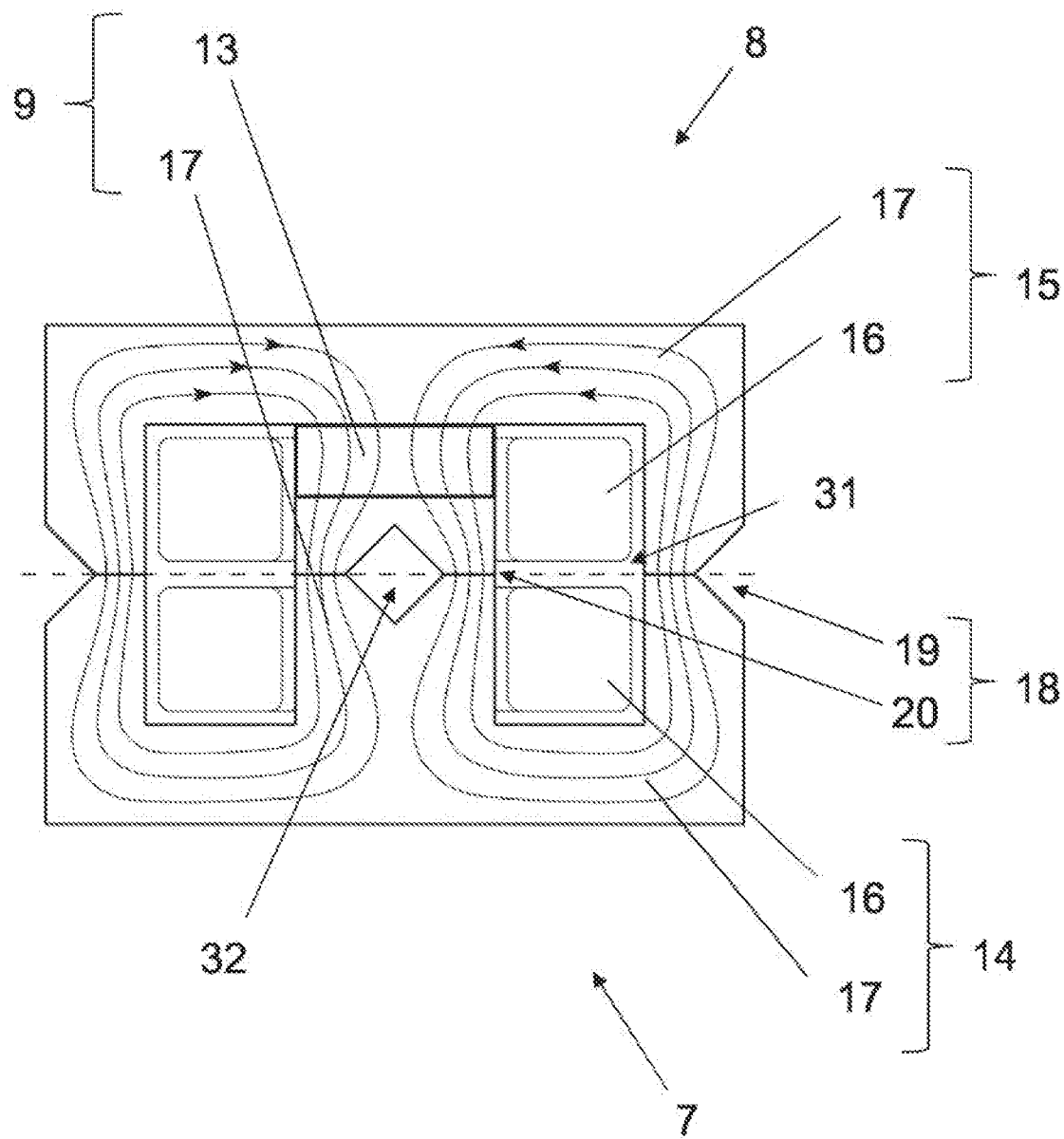
FIG. 5 is a diagrammatic sectional view of magnetic means held against each other in the unpowered state.

The diagrammatic view in FIG. 1 shows a first embodiment of a machine tool, in the form of a circular saw or sliding table circular saw, having a safety system 1. The machine tool 2 has a frame 4 and a table 22 for supporting or guiding a workpiece (not shown) to be machined. A tool 3 in the form of a circular saw blade partially projects out of an opening 23 in the table 22, from the inner region 24 of the machine tool 2, above the upper edge of the table 22. The tool 3 of the machine tool 2 is disposed in a working position in the configuration shown in FIG. 1a. The tool 3 which has a rotational direction 27 provided in operation of the machine tool 2 and indicated by a curved arrow is mounted to a clamping device 5. The clamping device 5 can be for example part of a sawing assembly having a drive. The clamping device 5 is mounted linearly displaceably at a guide 10 which in this embodiment is in the form of a linear guide 11. The direction of movement 28 of the clamping device 5 together with the tool, that is allowed by the linear guide 11, is indicated by a perpendicular arrow. By virtue of the fact that a first magnetic means 7 on the clamping device 5 cooperates with a second magnetic means 8 which as shown in FIGS. 3, 4 and 5 can have a permanent magnet and which is arranged by way of a displacement device 25 on the frame 4, the tool 3 is held in the working position (see in that respect for example FIG. 5). The position of the clamping device 5 and thus the tool 3 relative to the table 22 can be changed by the displacement device 25. The displacement direction 29 of the displacement device 25 is indicated by a perpendicular arrow. In the illustrated structure the first magnetic means 7, the second magnetic means 8 and the guide 10 in the form of a linear guide 11 form a motion device 6, by means of which the tool 3 can be moved guidedly from a working position into a safety position (see FIG. 1*b*).

The machine tool 2 further has a detection device 21, by means of which a risk situation for a user—like for example accidental intrusion on the part of the user into the tool 3—can be detected. If in operation of the machine tool 2 such a risk situation is detected by means of the detection device 21 the tool 3 can be moved by means of the motion device 6 out of the working position into the safety position, in which case the movement can be triggered and/or performed by the magnetic means 7, 8. Triggering or implementation of the movement can be effected for example by switching off an attracting force operative between the magnetic means 7, 8. In that situation for example the tool 3 or the clamping device 5 can be moved by means of the force of gravity, guided by the guide 10, from the working position into the safety position. It is however also possible for triggering or implementation of the movement to be effected by switching on a repelling force operative between the magnetic means 7, 8. The movement can be triggered by an initially acting magnetic force between the magnetic means 7, 8 and can possibly also be further performed over the duration of the movement by a magnetic force between the magnetic means 7, 8.

In the diagrammatic view in FIG. 1*b* the tool 3 of the machine tool 2 is in a safety position, with the tool 3 as shown in the safety position being arranged substantially completely in the inner region 24 of the machine tool 2. The tool 3 together with the clamping device 5 and the first magnetic means 7 arranged thereon has moved along the linear guide 11 from the working position into the safety position, in which case, when the safety position is reached, the movement of the clamping device 5 was braked by the end position damper 26. For a user therefore there is substantially no longer any immediate possibility of coming into contact with the tool 3. After a movement of the tool 3 from the working position into the safety position has taken place a return movement of the tool 3 into the working position can be produced by the displacement device 25. The second magnetic means 8 arranged on the displacement device 25 can be moved relative to the first magnetic means disposed on the clamping device 5 which is now in the safety position, can be coupled thereto, and consequently the clamping device 5 together with the tool 3 can be moved into a working position of the tool 3 again by means of the displacement device 25.

Figure 2B:
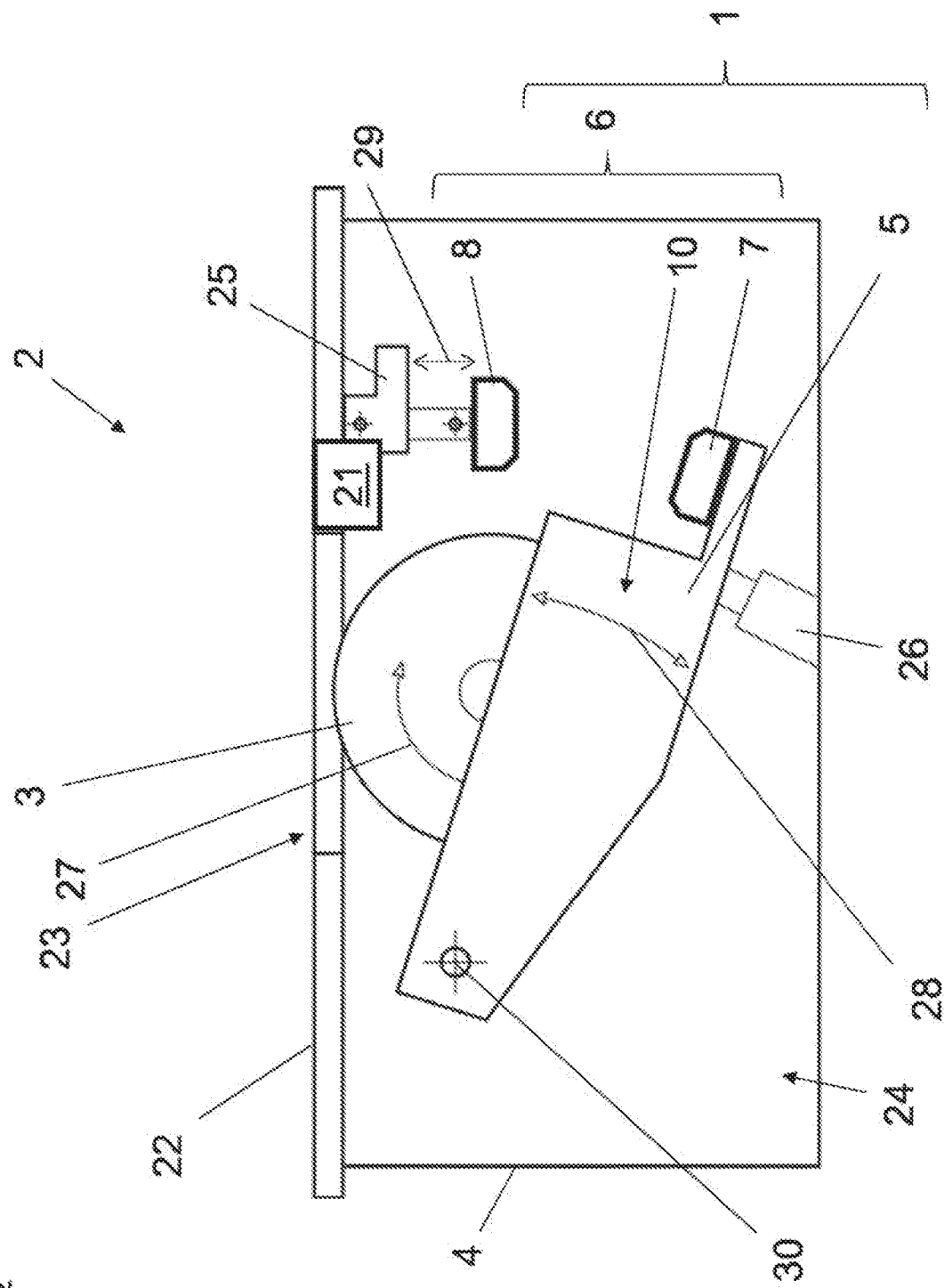
FIG. 2b is a diagrammatic view of a second embodiment of a machine tool in a safety position.

The diagrammatic view in FIG. 2*a* shows a second embodiment of a machine tool 2, again in the form of a circular saw or sliding table circular saw, having a safety system 1. Components which are similar in respect of structure and their function are denoted by the same references as in the embodiment of FIGS. 1*a* and 1*b*. The tool 3 of the machine tool 2 is disposed in a working position in the configuration shown in FIG. 2*a*. In contrast to the structure in FIGS. 1*a* and 1*b* the clamping device 5 is mounted to the frame 4 of the machine tool 2 pivotably by way of a guide 10 having a pivot mounting 30. The direction of movement 28, allowed by the pivot mounting 30, of the pivotal movement of the clamping device 5 together with the tool 3 is indicated by a curved arrow. The first magnetic means 7, the second magnetic means 8 and the guide 10 having the pivot mounting 30 form a motion device 6, by means of which the tool 3 can be moved guidedly from a working position into a safety position (see FIG. 2*b*).

In the diagrammatic view in FIG. 2*b* the tool 3 of the machine tool 2 is again in a safety position, wherein the tool 3, as shown in the safety position, is again arranged substantially completely in the inner region 24 of the machine tool 2. The tool 3 together with the clamping device 5 and the first magnetic means 7 thereon was pivoted about the pivot mounting 30 from the working position into the safety position, wherein, when the safety position was reached, the movement of the clamping device 5 was again braked by the end position damper 26. For a user therefore there is substantially no immediate possibility of coming into contact with the tool 3.

FIGS. 3 and 4 each show a diagrammatic sectional view of a particularly preferred embodiment of the magnetic means 7, 8. In the illustrated structure the magnetic means 7, 8 are firstly each in the form of an electromagnet 14, 15. Each of the electromagnets 14, 15 has a coil 16 having a core 17, the coil 16 being substantially completely embedded in the core 17. The material of each core 17 is advantageously in the form of a magnetic substance, specifically a ferromagnetic substance like for example iron. As illustrated the two magnetic means 7, 8 are arranged in mutually opposite and coaxial relationship.

As can be seen from the views in FIGS. 3 and 4 the core 17 in each case is substantially in the form of a cylinder or also a prism or a cuboid having a peripheral surface and two end faces. The core 17 is respectively arranged substantially concentrically with the coil 16. For guiding—especially for focusing—the magnetic flux a respective one of the end faces of the core 17, in an edge region, has means 18 for guiding the magnetic flux, which in the illustrated embodiment are in the form of two substantially annular or bar-shaped extensions 19, 20. The substantially annular or bar-shaped extensions 19, 20 each are of a substantially trapezoidal cross-section. The means 18 for guiding the magnetic flux, in other words, are substantially in the form of a web-like structure projecting axially from the basic shape of the core 17.

In FIG. 4 the magnetic means 7, 8 are shown in a position in which they have come into contact with each other at the substantially annular or bar-shaped extensions 19, 20. Such a position of the magnetic means 7, 8 relative to each other can occur for example in a working position of the tool 3 (see FIG. 1*a* and FIG. 2*a*). It can be clearly seen from FIG. 4 that the substantially annular or bar-shaped extensions 19, 20 mean that between the cores 17 of the magnetic means 7, 8 in the form of electromagnets 14, 15, there is an air gap in the form of a respective annular or bar-shaped axial recess 31 and a central recess 32. In an energized state of the coils 16 the flux density of the magnetic flux will therefore pass focused or concentrated through the substantially annular or bar-shaped extensions 19, 20 and the force operative between the magnetic means 7, 8 is thus markedly increased by virtue of the concentrated flux.

As illustrated one of the magnetic means 8 can additionally include a permanent magnet 13. A holding device 9 can be provided by the permanent magnet 13 of the second magnetic means 8, by virtue of a cooperation with the core 17 of the first magnetic means 7. Such a holding device 9 means that the tool 3 can be held in the working position even in an unpowered state of the electromagnets 14, 15.

A particularly advantageous configuration of the motion device 6 can firstly be afforded for example by the holding force, by which the tool 3 is held in a working position, being applied by a permanent magnet 13. As shown in FIGS. 3 and 4 the permanent magnet 13 can be disposed in the core 17 of the second magnetic means 8 which is in the form of an electromagnet 15. Advantageously the second magnetic means 8 is arranged over the first magnetic means 7. When the magnetic means 7, 8 are in the form of electromagnets 14, 15 as a result the clamping device 5 for the tool 3 can be held in the working position even in a non-energized state of the electromagnets 14, 15. Advantageously the coils 16 of the electromagnets 14, 15 can be of an oppositely oriented winding direction. Series or serial connection of the coils 16 can make it easily possible to achieve simultaneous activation or also deactivation of the magnetic means 7, 8. By virtue of the winding direction of the two coils 16 of the electromagnets 14, 15 being oriented in opposite relationship in the assembled position of the magnetic means 7, 8 in the motion device 6 a repelling force can be made possible between the two magnetic means 7, 8, with a series connection of the coils. As, in such an arrangement, for example the magnetic flux from the core 17 of the electromagnet 14 scarcely passes into the core 17 of the other electromagnet 15 (simultaneous build-up of the flux, opposite flux directions), the magnetic flux of each individual electromagnet 14, 15 can be built up very quickly, wherein advantageously short reaction times (fast triggering) of the motion device 6 can be made possible. By virtue of the above-mentioned arrangement of the permanent magnet 13 the magnetic flux which is caused thereby and which firstly serves to apply the holding force can contribute to repulsion of the magnetic means 7, 8.

FIG. 5 shows a diagrammatic sectional view of magnetic means 7, 8 which are held against each other in the unpowered state. The second magnetic means 8 as illustrated additionally has a permanent magnet 13. A holding device 9 can be formed by the permanent magnet 13 of the second magnetic means 8 by virtue of cooperation with the core 17 of the first magnetic means 7. In FIG. 5 the cooperation is represented by the field lines of the magnetic flux induced by the permanent magnet 13 through the core 17 of the second magnetic means 8 and the core 17 of the first magnetic means 7. In this respect the concentration of the field lines also shows how the magnetic flux is concentrated by the means 18 for guiding the magnetic flux (extensions 19, 20). The magnetic means 7, 8 can be held against each other in the unpowered state by the magnetic attraction force of the permanent magnet 13.

Figure 6:
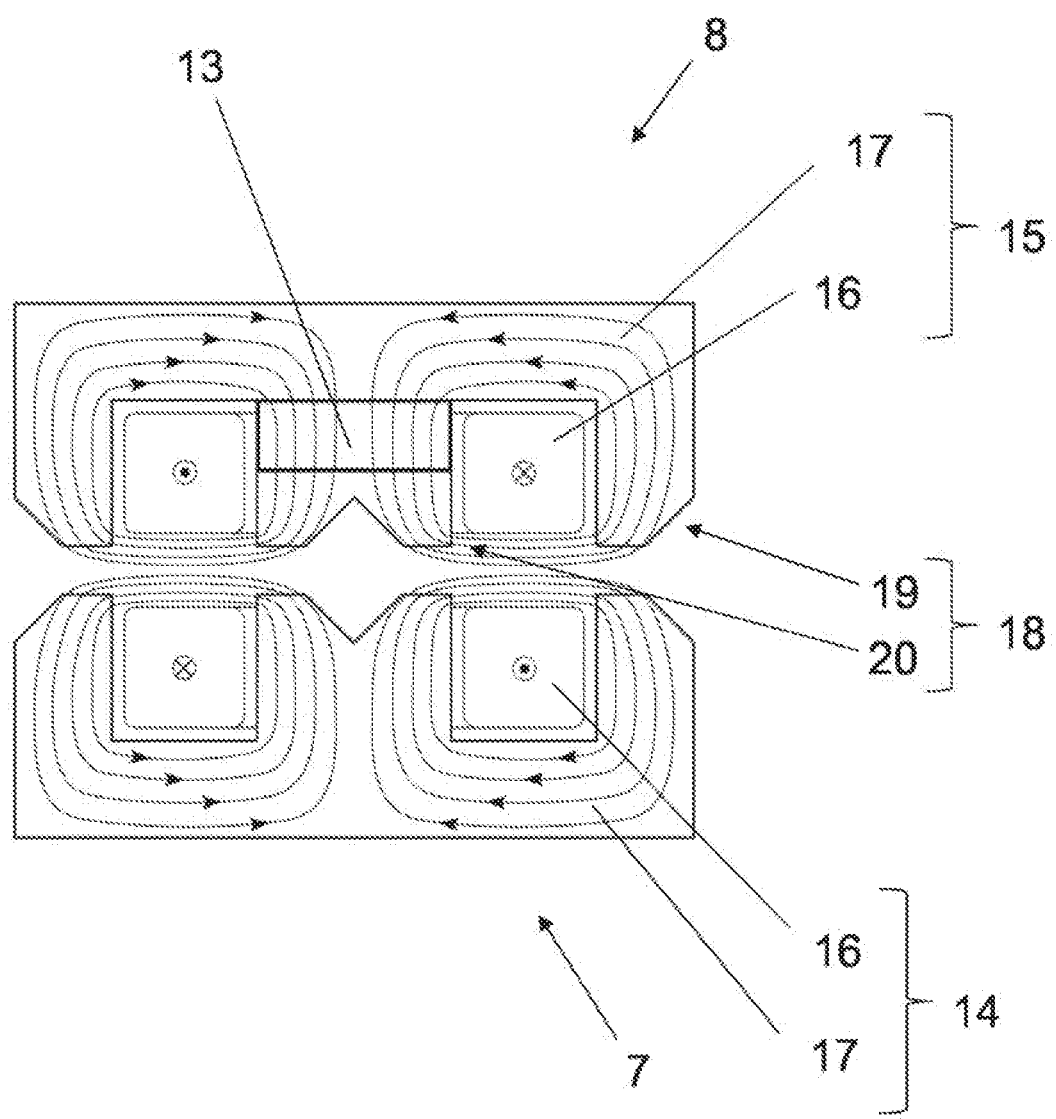
FIG. 6 is a diagrammatic sectional view of energized and mutually repelling magnetic means.

FIG. 6 shows a diagrammatic sectional view of energized magnetic means 7, 8 which are repelling each other. The respective resulting flow directions of the current flow through the coils 16 of the electromagnets 14, 15 are in this case oriented in mutually opposite relationship so that the magnetic fluxes, again indicated by field lines, of the electromagnets 14, 15 are in opposite relationship and a force action repelling the electromagnets 14, 15 relative to each other is produced. The permanent magnet 13 in this case can support the magnetic flux through the core 17 of the electromagnet 15. It may be advantageous if the permanent magnet 13 is arranged in the second magnetic means 8 connected to the frame 4 of the machine tool 3 as same is exposed to lower acceleration forces. FIG. 6 once again shows by the concentration of the field lines how the magnetic flux is concentrated by the means 18 for guiding the magnetic flux (extensions 19, 20).

FIG. 7 shows a diagrammatic sectional view of a further configuration of magnetic means 7, 8. This structure provides that the second magnetic means 8, especially the core 17, comprises a magnetically semi-hard material. The first magnetic means 7, especially the core 17, can also be made from a magnetically semi-hard material or made from a magnetically soft material. By virtue of at least temporary energization of one of the coils 16 the magnetically semi-hard material can have a remanence magnetization whereby the magnetic means 7, 8 formed in that way, even in the unpowered state of the coils 16, can be held together by a magnetic force.

FIG. 8 shows a diagrammatic view of a third embodiment of a machine tool 2 having a tool 3 in a safety position, wherein in this structure the safety device 1 in addition to the magnetic means 7, 8 has a linear drive 12 with a rotor 33 displaceable linearly relative to a stator 34. Such an arrangement of a rotor 33 in relation to a stator 34 is known in the state of the art for example from linear motors or magnetic levitation trains and can be correspondingly of an electrical design. The linear drive 12 for example—with a suitable design—can trigger the movement of the tool 3 by the motion device 6 from the working position into the safety position by means of magnetic force and/or at least partially implement or support same. In the illustrated state the linear drive 12 can for example prestress the motion device 6 in addition to the force of gravity in order to increase the acceleration in the triggering situation. In the proximity of the end position the linear drive 12 can also have a braking action and thus brake the movement before meeting the end abutment. In principle the possibility should not be excluded that the linear drive 12 can be electric, pneumatic or hydraulic. The user of a spring element (not shown), for example for further increasing the prestressing effect, is also conceivable. The FIG. 8 structure of the safety device 1 has a guide 10 in the form of a linear guide 11 but it is also conceivable for the guide 10 to be in the form of a pivot mounting 30.

LIST OF REFERENCE NUMERALS 1 safety system
2 machine tool
3 tool
4 frame
5 clamping device
6 motion device
7 first magnetic means
8 second magnetic means
9 holding device
10 guide
11 linear guide
12 linear drive
13 permanent magnet
14 electromagnet
15 electromagnet
16 coil
17 core
18 means for guiding the magnetic flux
19 extension
20 extension
21 detection device
22 table
23 opening
24 inner region
25 displacement device
26 end position damper
27 rotational direction
28 movement direction
29 displacement direction
30 pivot mounting
31 axial recess
32 central recess
33 rotor
34 stator

The invention claimed is:

1. A safety system for a machine tool which has a frame and a tool, the safety system comprising:
   a clamping device for clamping or mounting the tool in or to the machine tool; and
   a motion device,
   wherein:
   the clamping device is moveably arranged on the frame of the machine tool;
   the motion device is configured to move the clamping device from a working position in which the tool is extended and can be used for working to a safety position in which the tool is retracted;
   the motion device includes a first magnetic means and a second magnetic means;
   the first magnetic means is connected to the clamping device;
   the second magnetic means is arranged on the frame of the machine tool;
   the motion device is configured to move the tool from the working position to the safety position at least partially by a magnetic force acting between the first magnetic means and the second magnetic means;
   the first magnetic means and the second magnetic means are arranged in a mutually coaxially opposite relationship; and
   the first magnetic means and the second magnetic means are in direct contact with each other when the tool is in the working position.

2. The safety system of claim 1, wherein the motion device further includes a holding device configured to hold the tool in the working position by a holding force.

3. The safety system of claim 2, wherein the motion device is configured to apply the holding force at least partially by at least one of the first magnetic means or the second magnetic means.

4. The safety system of claim 3, wherein the at least one of the first magnetic means or the second magnetic means is configured to magnetically overcome the holding force for triggering movement of the tool by the motion device from the working position to the safety position.

5. The safety system of claim 1, wherein the motion device further includes a guide for movement of the tool by the motion device.

6. The safety system of claim 5, wherein the guide is linear.

7. The safety system of claim 1, wherein the first magnetic means or the second magnetic means includes a permanent magnet or a magnetically semi-hard material.

8. The safety system of claim 7, wherein the magnetically semi-hard material has remanence magnetization.

9. The safety system of claim 1, wherein the first magnetic means or the second magnetic means includes a magnetizable substance.

10. The safety system of claim 9, wherein the magnetizable substance is ferromagnetic.

11. The safety system of claim 1, wherein the first magnetic means or the second magnetic means includes an electromagnet.

12. The safety system of claim 11, wherein the electromagnet includes a coil having a magnetizable core.

13. The safety system of claim 12, wherein:
    the electromagnet includes a first electromagnet and a second electromagnet; and
    the coil of the first electromagnet and the coil of the second electromagnet are connected in series or parallel.

14. The safety system of claim 13, wherein:
    the magnetizable core is a cylinder, a prism or a cuboid having a peripheral surface and two end faces;
    the magnetizable core is arranged concentrically relative to the coil of the electromagnet; and
    in an end region, one of the two end faces of the magnetizable core includes a means for guiding magnetic flux.

15. The safety system of claim 13, wherein, in an assembled position in the motion device, the coil of the first electromagnet and the coil of the second electromagnet are of oppositely oriented winding directions.

16. The safety system of claim 14, wherein the means for guiding magnetic flux includes an annular or bar-shaped extension at one of the two end faces of the magnetizable core.

17. The safety system of claim 14, wherein the coil of the electromagnet is at least partially embedded in the magnetizable core.

18. The safety system of claim 16, wherein the annular or bar-shaped extension has a trapezoidal cross section.

19. The safety system of claim 1, further comprising a detection device for detecting a risk of injury to a user by the tool.

20. The safety system of claim 19, wherein the motion device is configured to move the tool based on detection of the risk of injury to the user by the tool.

21. The safety system of claim 1, wherein the motion device is configured to move the tool from the working position to the safety position such that the first magnetic means and the tool are moved jointly.

22. The safety system of claim 21, wherein the first magnetic means and the tool are moved jointly over an entire distance of the movement of the tool by the motion device from the working position to the safety position.

23. The safety system of claim 1, wherein:
    the first magnetic means or the second magnetic means includes an energizable electromagnet; and
    the energizable electromagnet is configured to be:
    non-energized in the working position such that the magnetic force acting between the first magnetic means and the second magnetic means is an attracting magnetic force; and
    energized in the safety position such that the magnetic force acting between the first magnetic means and the second magnetic means is a repelling magnetic force.

24. The safety system of claim 23, wherein the first magnetic means or the second magnetic means includes a permanent magnet configured to cause the attracting magnetic force or a magnetically semi-hard material configured to cause the attracting magnetic force.

25. A machine tool comprising the safety system of claim 1.

26. The machine tool of claim 25, further comprising a table for supporting a workpiece,
    wherein:
    in the working position, the tool projects above the table at least partially out of an inner region of the machine tool; and
    in the safety position, a majority of the tool is arranged beneath the table in the inner region of the machine tool.

27. The machine tool of claim 26, further comprising a displacement device for positioning the tool relative to the table in the working position.

28. The safety system of claim 27, wherein the displacement device is arranged between the second magnetic means and the frame of the machine tool.

29. The machine tool of claim 25, further comprising an end position damper for damping movement of the tool upon reaching the safety position.

30. The machine tool of claim 25, wherein the machine tool is a slidable table circular saw.

31. A method using the safety system of claim 1, the method comprising:
operating the machine tool with the tool in the working position;
detecting a risk of injury to a user by the tool with a detection device; and
moving the tool to the safety position with the motion device,
wherein movement of the tool is triggered or at least partially implemented by the magnetic force acting between the first magnetic means and the second magnetic means.

32. The method of claim 31, wherein:
the machine tool further includes a displacement device for positioning the tool relative to a table of the machine tool in the working position; and
the method further comprises moving the tool back from the safety position to the working position with the displacement device.

33. A safety system for a machine tool which has a frame and a tool, the safety system comprising:
a clamping device for clamping or mounting the tool in or to the machine tool; and
a motion device,
wherein:
the clamping device is moveably arranged on the frame of the machine tool;
the motion device is configured to move the clamping device from a working position in which the tool is extended and can be used for working to a safety position in which the tool is retracted;
the motion device includes a first magnetic means, a second magnetic means and a holding device;
the first magnetic means is connected to the clamping device;
the second magnetic means is arranged on the frame of the machine tool;
the motion device is configured to move the tool from the working position to the safety position at least partially by a magnetic force acting between the first magnetic means and the second magnetic means;
the holding device is configured to hold the tool in the working position by a holding force;
the motion device is configured to apply the holding force at least partially by at least one of the first magnetic means or the second magnetic means; and
the first magnetic means and the second magnetic means are in direct contact with each other when the tool is in the working position.

* * * * *